US012605929B2

(12) United States Patent
Tozuka et al.

(10) Patent No.: US 12,605,929 B2
(45) Date of Patent: *Apr. 21, 2026

(54) LIQUID EJECTION HEAD

(71) Applicant: RISO Technologies Corporation, Tokyo (JP)

(72) Inventors: Takashi Tozuka, Sunto Shizuoka (JP); Minoru Koyata, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 18/324,870

(22) Filed: May 26, 2023

(65) Prior Publication Data

US 2024/0025172 A1 Jan. 25, 2024

(30) Foreign Application Priority Data

Jul. 25, 2022 (JP) ................................ 2022-118104

(51) Int. Cl.
*B41J 2/14* (2006.01)

(52) U.S. Cl.
CPC ......... *B41J 2/14209* (2013.01); *B41J 2/1433* (2013.01); *B41J 2002/14419* (2013.01); *B41J 2002/14483* (2013.01); *B41J 2002/14491* (2013.01); *B41J 2202/10* (2013.01)

(58) Field of Classification Search
CPC .................. B41J 2/14209; B41J 2/1433; B41J 2002/14419; B41J 2002/14483; B41J 2002/14491; B41J 2202/10; B41J 2/1609; B41J 2/1623; B41J 2/1631; B41J 2/1632; B41J 2/1643; B41J 2/1646; B41J 2202/08; B41J 2202/20; B41J 2/14274
See application file for complete search history.

(56) References Cited

U.S. PATENT DOCUMENTS

| | | | |
|---|---|---|---|
| 2008/0218556 | A1 | 9/2008 | Seto |
| 2015/0124019 | A1 | 5/2015 | Cruz-Uribe |
| 2016/0263889 | A1 | 9/2016 | Hamaguchi |
| 2019/0389220 | A1 | 12/2019 | Chen |

(Continued)

FOREIGN PATENT DOCUMENTS

| | | | | |
|---|---|---|---|---|
| CN | 117360080 | A | 1/2024 | |
| EP | 2803486 | A1 * | 11/2014 | .......... B41J 2/14209 |
| JP | 2018122551 | A | 8/2018 | |

OTHER PUBLICATIONS

U.S. Appl. No. 18/322,992, filed May 24, 2023.

(Continued)

*Primary Examiner* — Justin Seo
(74) *Attorney, Agent, or Firm* — Kim & Stewart LLP

(57) ABSTRACT

According to one embodiment, a liquid ejection head includes a substrate with an opening through which a first liquid can pass. An actuator is on a first side of the substrate and has a plurality of pressure chambers. A manifold is on a second side of the substrate. The manifold forms a first flow path for a second fluid. The liquid ejection head has first electrode with portions formed on an upper surface of the actuator, a surface on the first side of the substrate, an inner wall of the opening, and a surface on the second side of the substrate in a region outside the first flow path.

20 Claims, 11 Drawing Sheets

(56) References Cited

U.S. PATENT DOCUMENTS

| | | | | |
|---|---|---|---|---|
| 2023/0087927 | A1* | 3/2023 | Tozuka | B41J 2/1433 347/1 |
| 2024/0009997 | A1* | 1/2024 | Koyata | B41J 2/14209 |

OTHER PUBLICATIONS

Extended European Search Report dated Nov. 30, 2023, mailed in counterpart European Application No. 23179880.2, 9 pages.
Chinese Office Action dated Dec. 11, 2025, mailed in counterpart Chinese Application No. 202310431322.0, 11 pages.

* cited by examiner

LIQUID EJECTION HEAD

CROSS-REFERENCE TO RELATED APPLICATION

This application is based upon and claims the benefit of priority from Japanese Patent Application No. 2022-118104, filed Jul. 25, 2022, the entire contents of which are incorporated herein by reference.

FIELD

Embodiments described herein relate generally to a liquid ejection head.

BACKGROUND

There is an liquid ejection head that includes an actuator in which a plurality of partition walls are formed at predetermined intervals and pressure chambers are formed between the partition walls. There is also a liquid ejection head using an independent drive structure having pressure chambers which are for ejecting liquid from nozzles and air chambers which are for not ejecting liquid. The air chambers provided in such a liquid ejection head can speed up the ejection of liquid.

For a liquid ejection head having such an independent drive structure, there is an example in which electrodes for the pressure chambers are led out to a driver IC side and electrodes for the air chambers are bundled in the center of a substrate to form a common electrode.

In such a liquid ejection head, if a common electrode resistance is high, there is a concern that a driver IC may be damaged by latch-up, and thus, it is preferable to reduce the common electrode resistance. In addition, if the speed of the ink ejection is increased, heat generated by the head substrate is increased. Therefore, in some cases, although a fluid flow path for temperature control is provided, the electrode film is formed on the back surface of the substrate in order to reduce resistance the common electrode. In this case, current is applied in a state in which the electrodes of the back surface of the substrate may be in contact with the flow path provided for temperature control, and the electrodes may thus corrode due to electrolysis.

DETAILED DESCRIPTION

The present disclosure concerns reducing the electrical resistance of a common electrode in an inkjet-type liquid ejection head or the like.

In general, according to one embodiment, a liquid ejection head includes a substrate with an opening through which a first liquid can pass. An actuator is on a first side of the substrate and has a plurality of pressure chambers. A manifold is on a second side of the substrate. The manifold forms a first flow path for a second fluid. The liquid ejection head has first electrode with portions formed on an upper surface of the actuator, a surface on the first side of the substrate, an inner wall of the opening, and a surface on the second side of the substrate in a region outside the first flow path.

Figure 1:
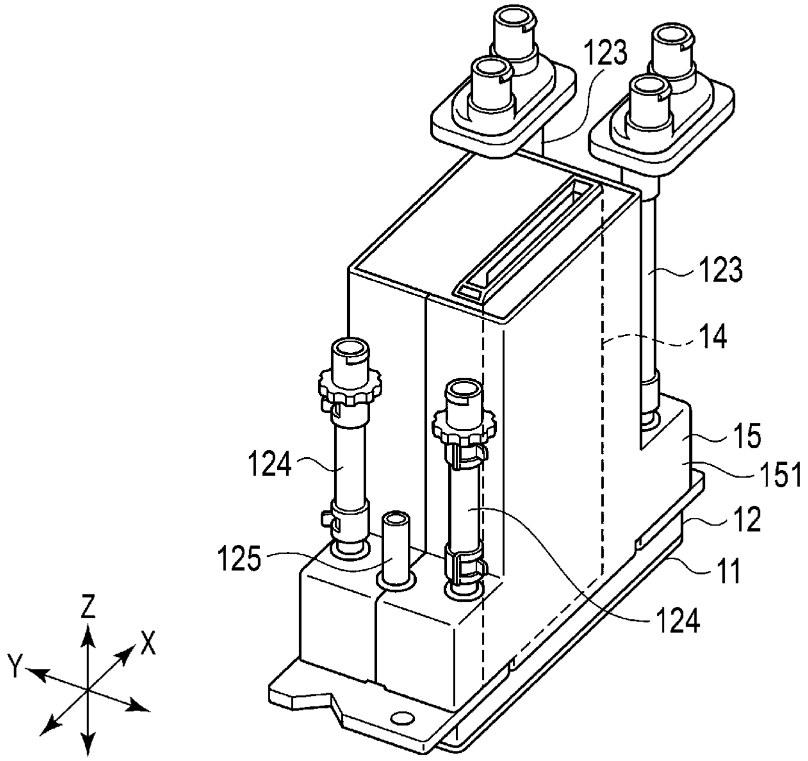
FIG. 1 is a perspective view illustrating a configuration of a liquid ejection head according to a first embodiment.
Figure 2:
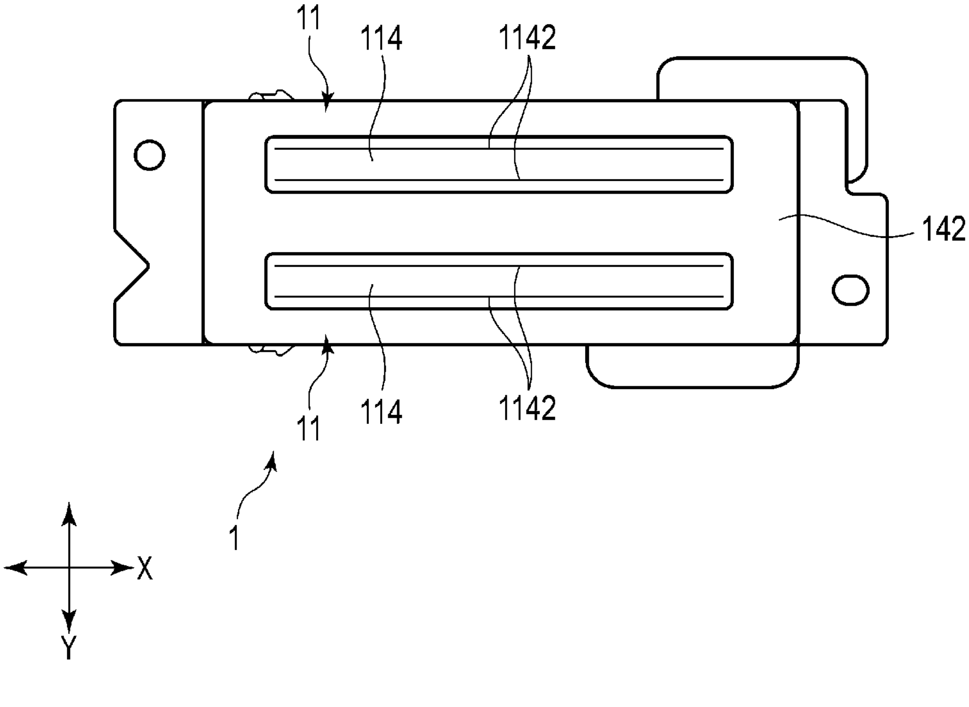
FIG. 2 is a bottom view illustrating a configuration of a liquid ejection head.
Figure 3:
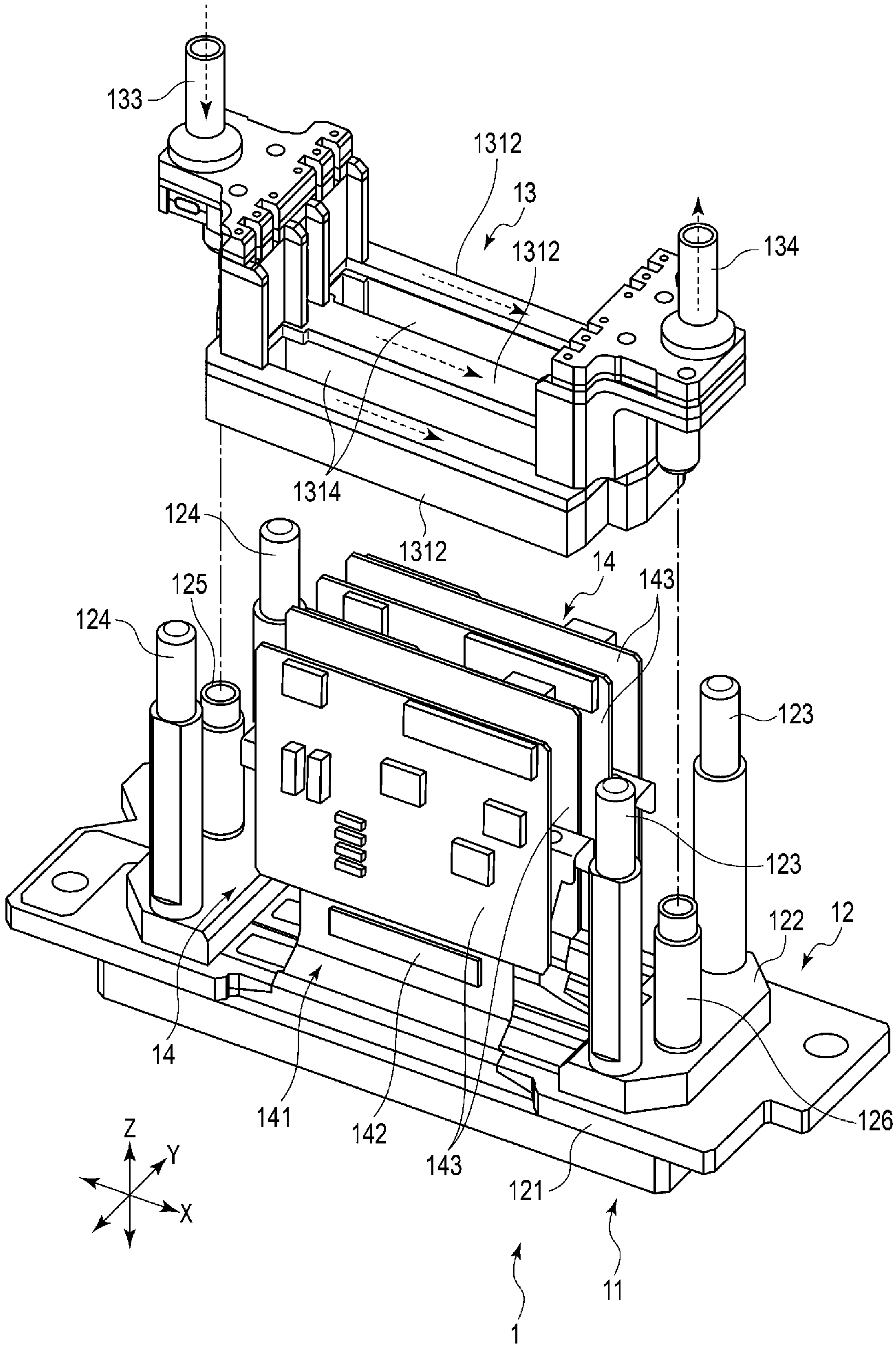
FIG. 3 is an exploded perspective view illustrating a configuration of a liquid ejection head.
Figure 4:
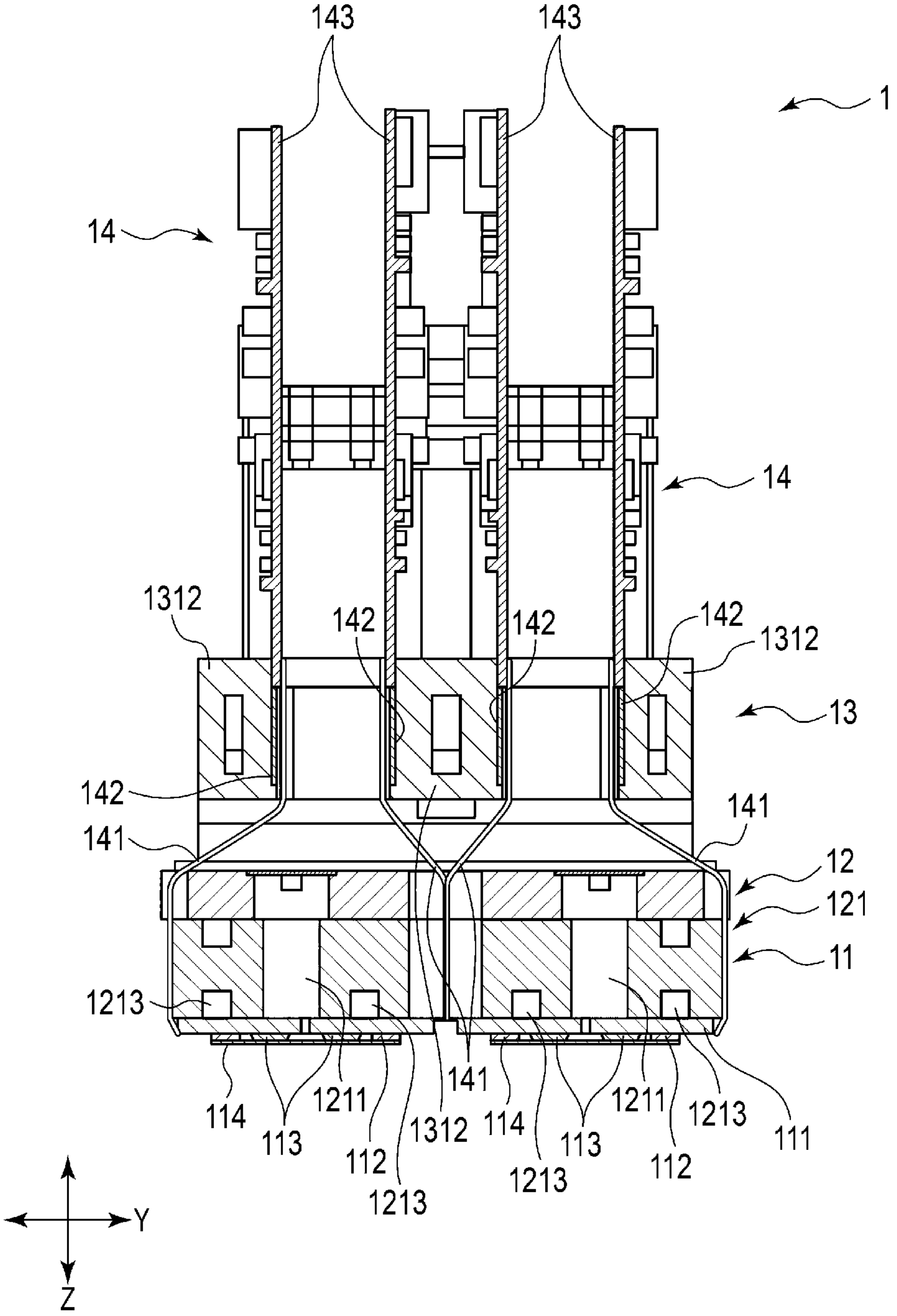
FIG. 4 is a cross-sectional view illustrating a configuration of a head body.
Figure 5:
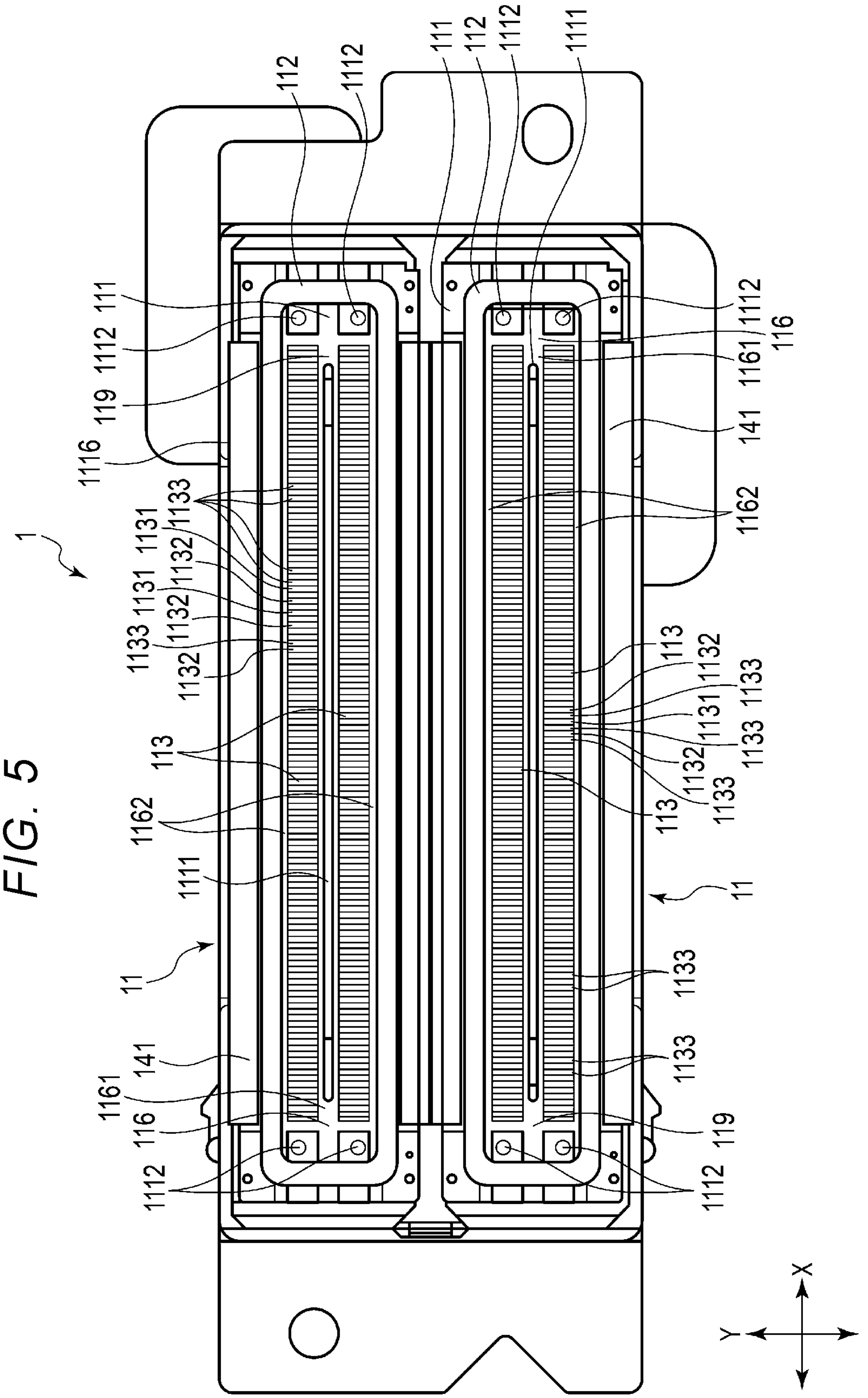
FIG. 5 is a plan view illustrating a configuration of a head body.
Figure 6:
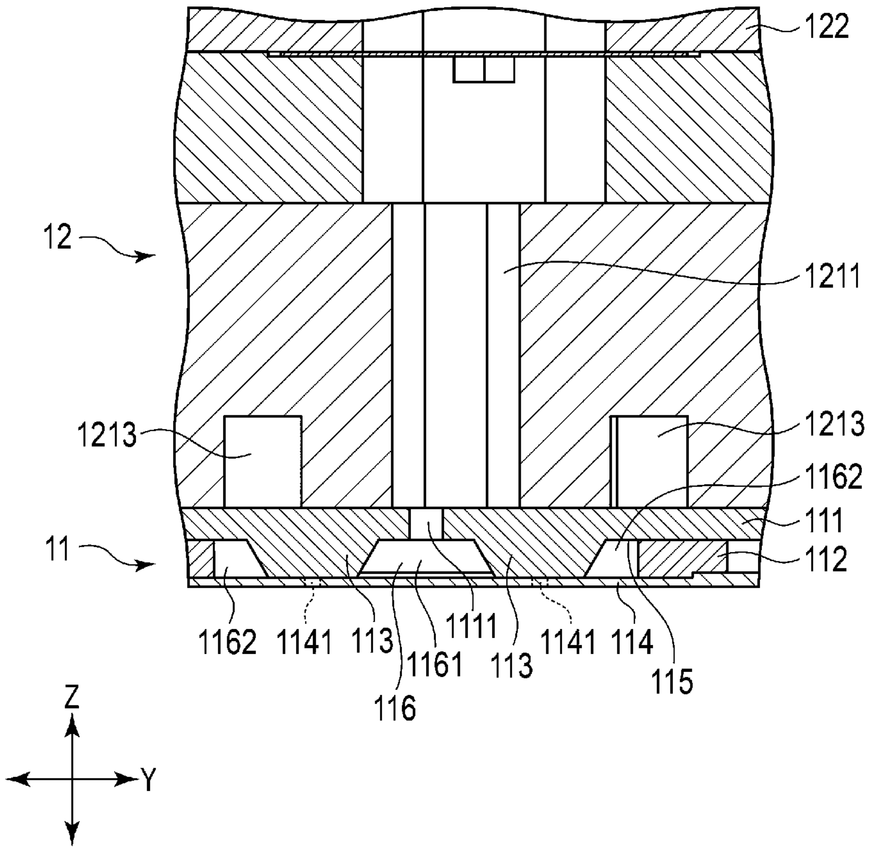
FIG. 6 is a cross-sectional view illustrating a configuration of a portion of a head body.
Figure 7:
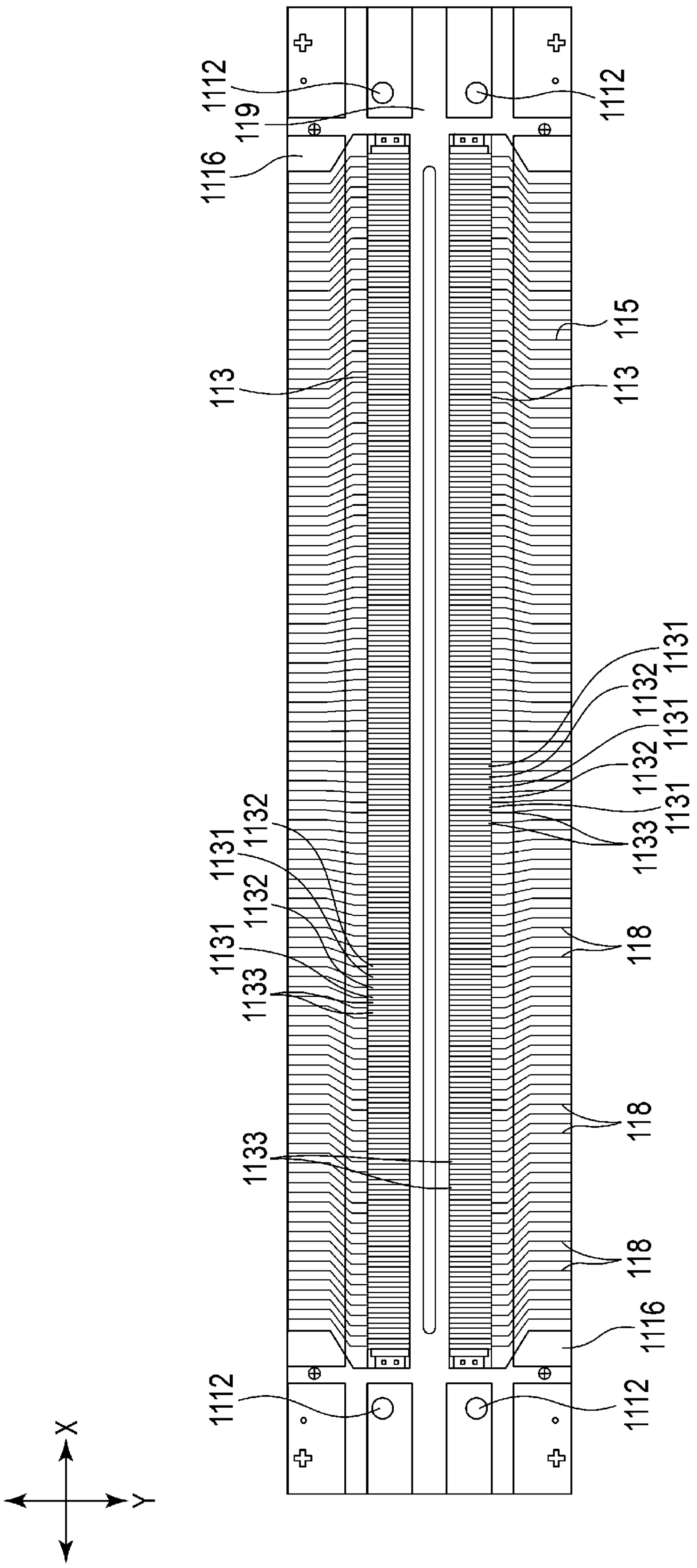
FIG. 7 is a plan view illustrating a configuration of a portion of a head body.
Figure 8:
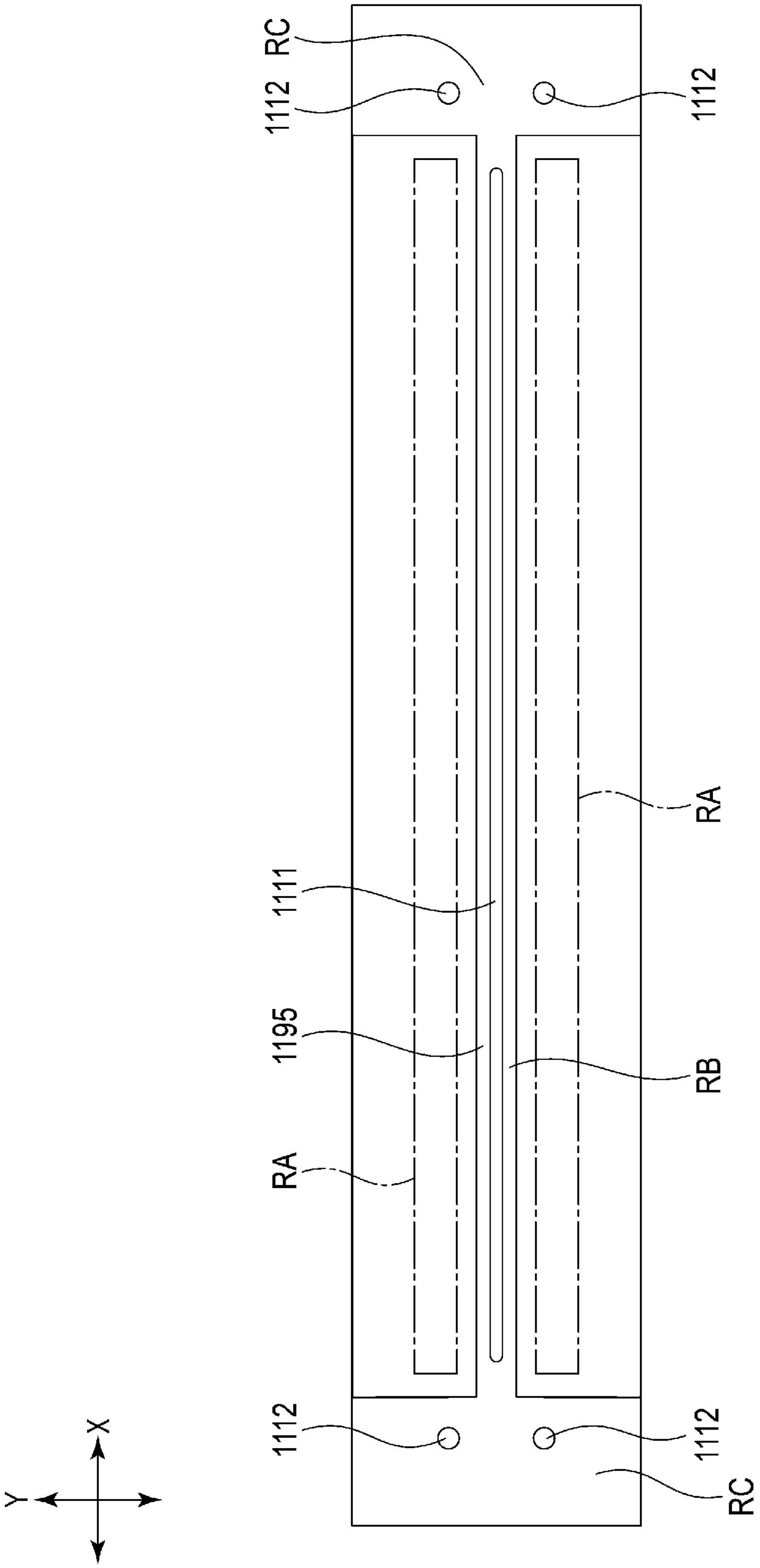
FIG. 8 is a bottom view illustrating a configuration of a portion of a head body.
Figure 9:
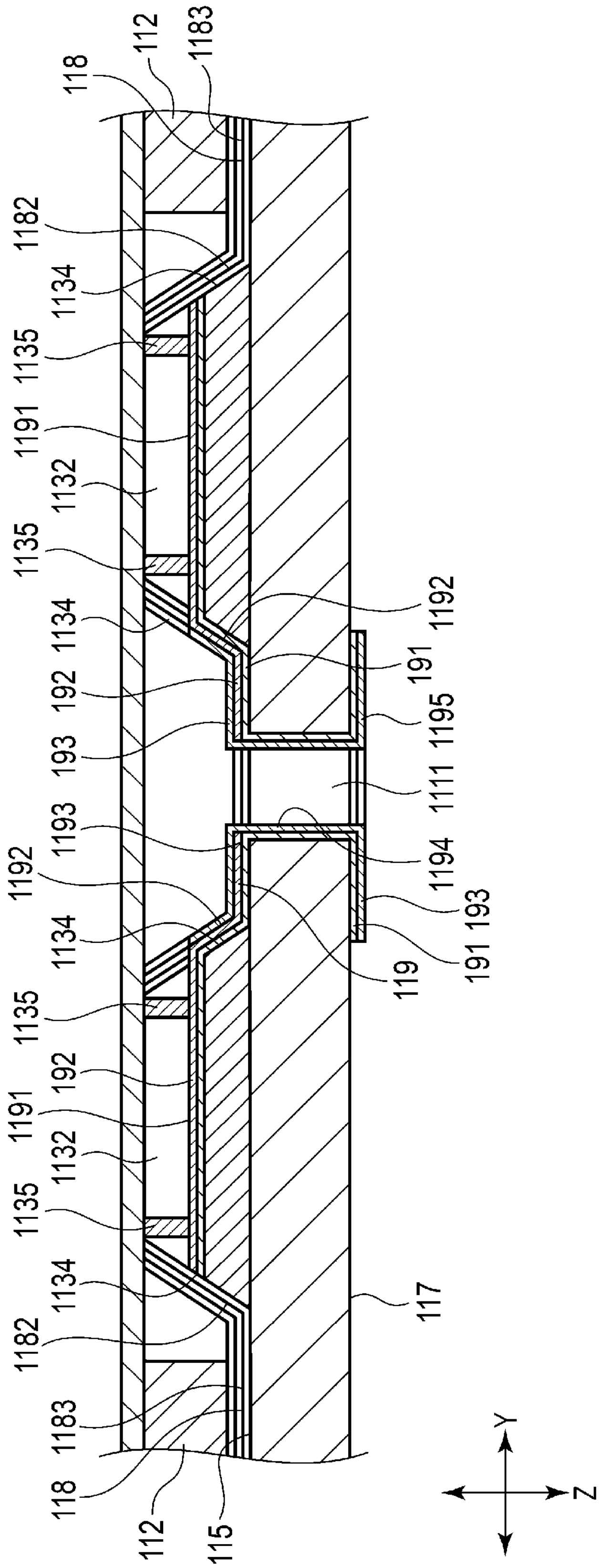
FIG. 9 is a cross-sectional view illustrating a configuration of a portion of a head body.
Figure 10:
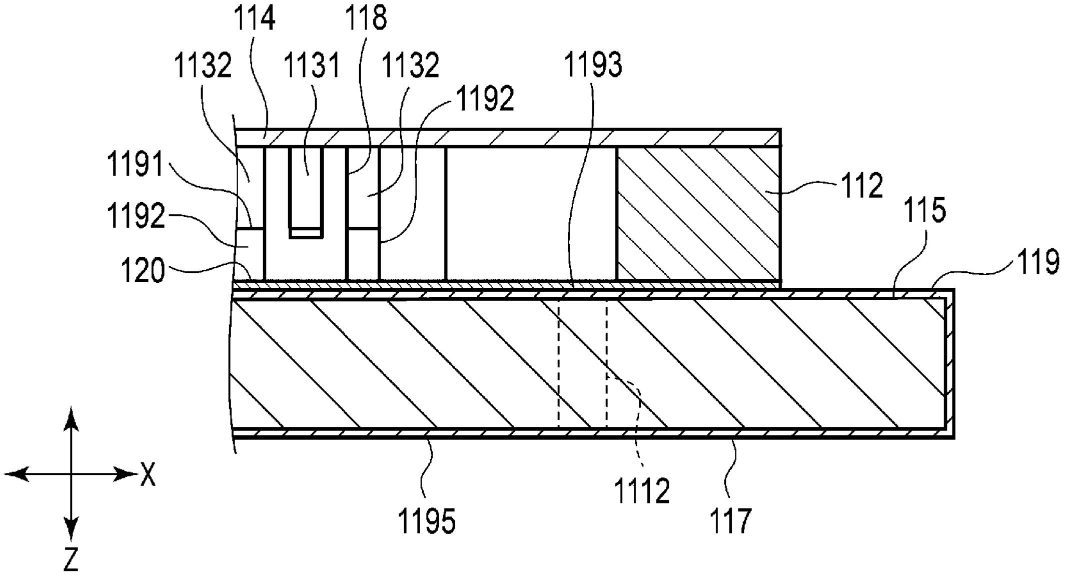
FIG. 10 is a cross-sectional view illustrating a configuration of a portion of a head body.
Figure 11:
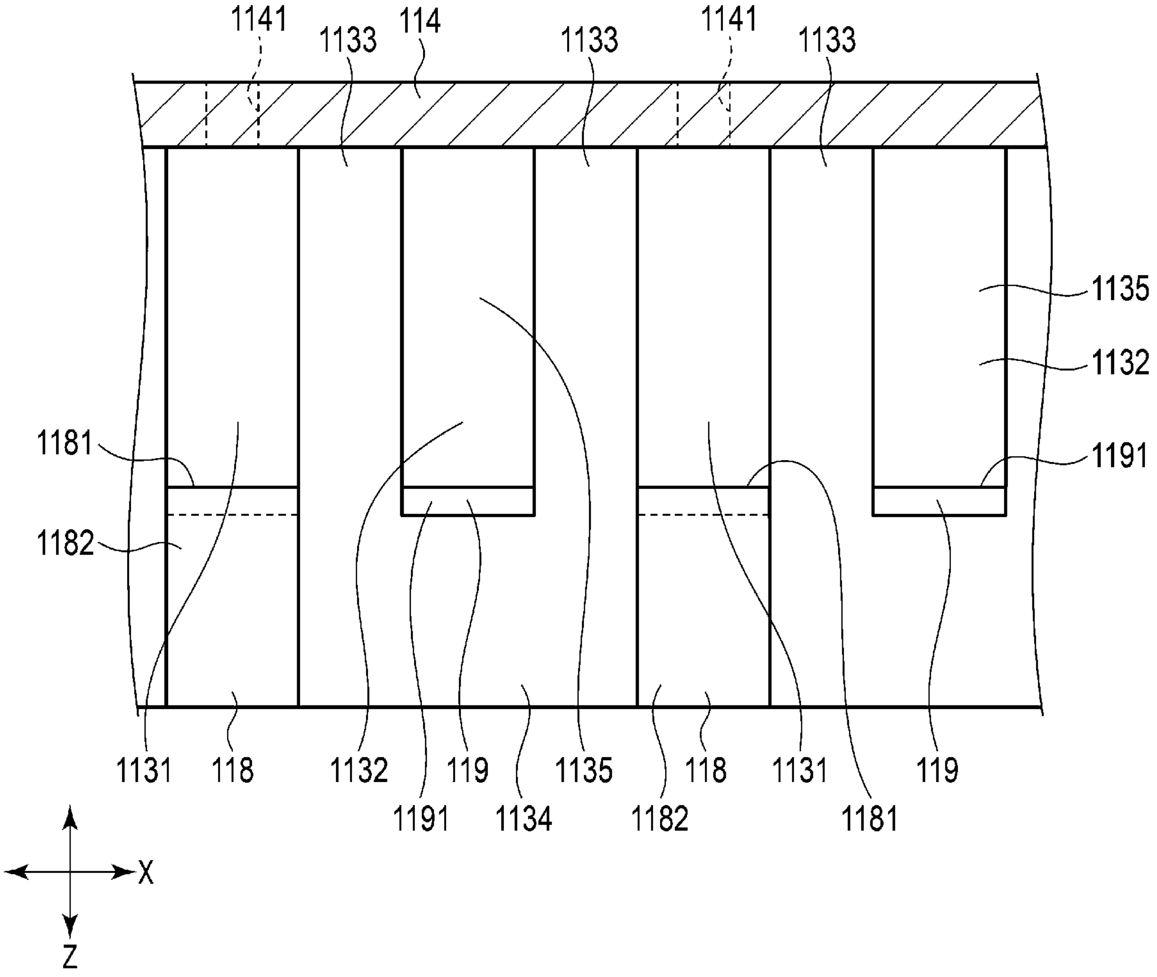
FIG. 11 is a cross-sectional view illustrating a configuration of a portion of a head body.

Hereinafter, a liquid ejection head 1 and a liquid ejection apparatus 2 using the liquid ejection head 1 according to a first embodiment will be described with reference to FIGS. 1 to 11. FIG. 1 is a perspective view illustrating a configuration of the liquid ejection head 1 according to the first embodiment, and FIG. 2 is a bottom view illustrating the configuration of the liquid ejection head 1. FIG. 3 is an exploded perspective view of the liquid ejection head 1, and FIG. 4 is a cross-sectional view illustrating a configuration of a head body 11. FIG. 5 is a bottom view of the liquid ejection head, and FIG. 6 is a cross-sectional view illustrating a portion of the head body. FIG. 7 is a bottom view illustrating the configuration of the liquid ejection head 1 with a nozzle plate 114 omitted. FIG. 8 is a plan view illustrating a configuration of a back side of the substrate. FIGS. 9 to 11 are cross-sectional views illustrating a configuration of a portion of the head body 11 of the liquid ejection head 1. In the figures, X, Y, and Z indicate three directions perpendicular to each other. It is noted that, in each figure, for the sake of description, aspects of the configuration may be illustrated as enlarged, reduced, or omitted as appropriate.

Figure 13:
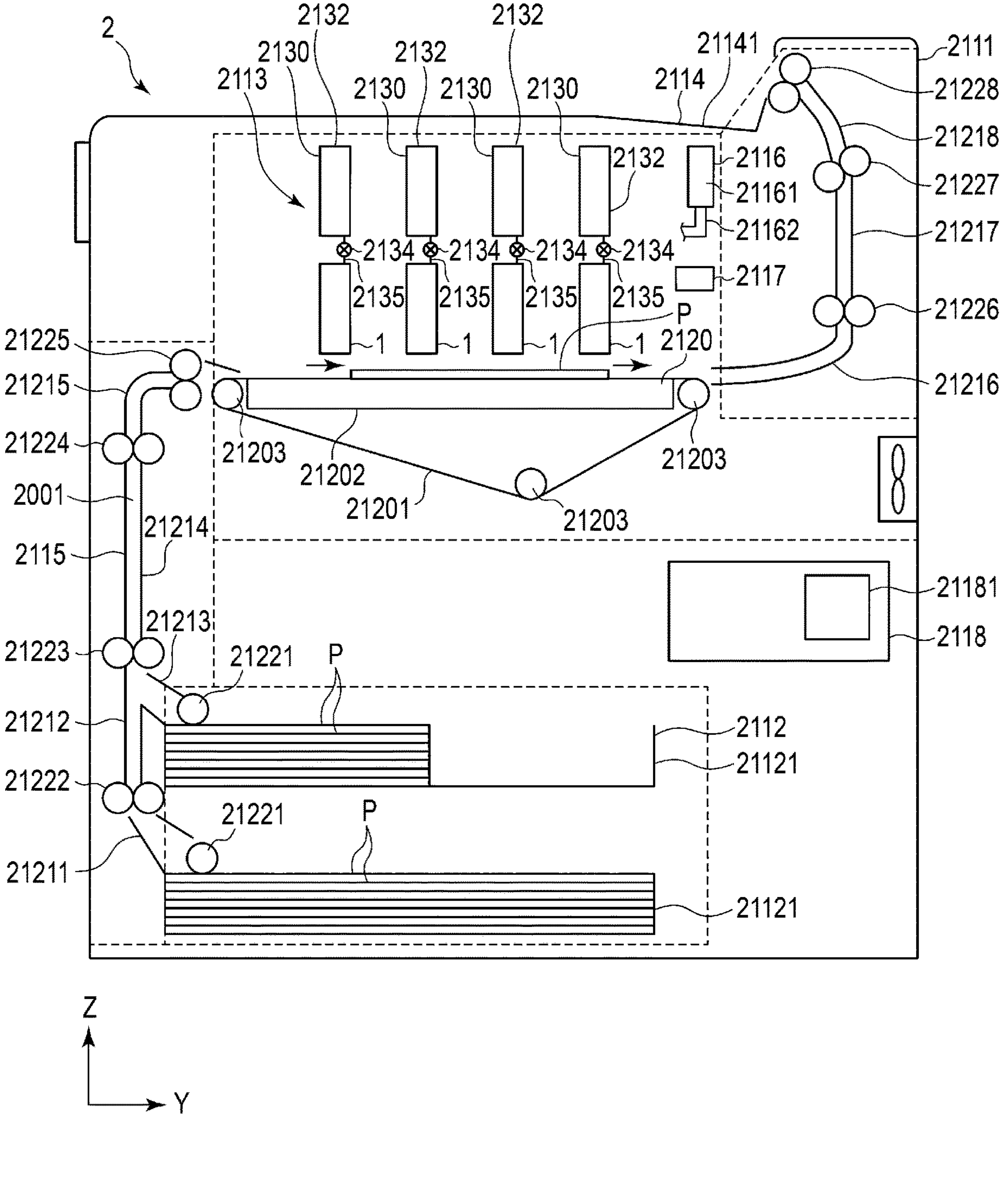
FIG. 13 depicts a configuration of a liquid ejection apparatus according to an embodiment.

The liquid ejection head 1 is, for example, a shear-mode inkjet head provided in the liquid ejection apparatus 2, which may be an inkjet recording apparatus such as illustrated in FIG. 13. The liquid ejection head 1 has, for example, an independent drive structure where pressure chambers 1131 and air chambers 1132 are alternately provided. The liquid ejection head 1 is provided in a head unit 2130 including a supply tank 2132 in the liquid ejection apparatus 2.

The liquid ejection head 1 is supplied with ink from the supply tank 2132. It is noted that the liquid ejection head 1 may be a non-circulation type head that does not circulate the ink or may be a circulation type head that circulates the ink. In the present embodiment, the liquid ejection head 1 will be described by using an example of the non-circulation type head. In addition, the liquid ejection head 1 is also connected to a cooling device 2116 provided in the liquid ejection apparatus 2 and is supplied with cooling liquid (e.g., cooling water) for controlling the temperature of a heat generating unit and the ink. The liquid ejection head 1 constitutes a water cooling circulation structure together with the cooling device 2116.

As illustrated in FIGS. 1 to 11, the liquid ejection head 1 includes the head body 11, a manifold unit 12, a cooling flow path unit 13, a circuit board 14, and a cover 15. For example, the liquid ejection head 1 is a side shooter type four-row integrated structure head having two sets of head bodies 11, each having a pair of actuators 113.

The head body 11 ejects liquid. The head body 11 includes a substrate 111, a frame 112, an actuator 113 having the plurality of pressure chambers 1131 and the plurality of air chambers 1132, and a nozzle plate 114.

The head body 11 has a common liquid chamber 116 communicating with the plurality of pressure chambers 1131 of the actuator 113. A primary side of the plurality of pressure chambers 1131 is the upstream side in a liquid flowing direction. A secondary side of the plurality of pressure chambers 1131 is the downstream side in the liquid flowing direction.

The head body 11 has an electrode portion comprising an electrode film formed on the substrate 111 and the actuator 113. Specifically, the head body 11 has, as electrode portions, a plurality of individual electrodes 118 respectively driving the plurality of pressure chambers 1131 of the actuator 113, and one or a plurality of common electrodes 119 for driving the plurality of pressure chambers 1131.

In the present embodiment, an example where the head body 11 has two actuators 113, and the common liquid chamber 116 has one first common liquid chamber 1161 and two second common liquid chambers 1162 is described. The common liquid chamber 116 includes, for example, the first common liquid chamber 1161 communicating with primary side openings (inlets of the pressure chambers 1131) of the plurality of pressure chambers 1131 of the actuator 113 and the second common liquid chamber 1162 communicating with secondary side openings (outlets of the pressure chamber 1131) of the plurality of pressure chambers 1131 of the actuator 113.

The substrate 111 is formed in a rectangular plate shape from a ceramic material such as alumina. The substrate 111 has a front surface 115 (upper surface), which is a polished surface, and a back surface 117. The substrate 111 is formed, for example, in a rectangular shape elongated in one direction (X direction). A third electrode portion 1183 (which is a portion of an individual electrode 118) and a third electrode portion 1193 (which is a portion of a common electrode 119) are formed on the front surface 115 of the substrate 111 and constitutes a polished surface. A pair of the actuators 113 are provided on the front surface 115 of the substrate 111 and aligned in a lateral direction (Y direction) of the substrate 111. The substrate 111 has one supply port 1111 and a plurality of discharge ports 1112, which are openings through which liquid passes. The supply port 1111 and the discharge ports 1112 are through holes penetrating between the main surfaces of the substrate 111.

It is noted that the back surface of the substrate 111 faces the manifold 121 and covers grooves formed on the facing surface of the manifold 121 for forming a first cooling flow path 1213 through which cooling water flows. That is, the substrate 111 forms the first cooling flow path 1213 together with the manifold 121. Therefore, a portion (region) of the back surface of the substrate 111 serves as a liquid contact area RA (a cooling liquid contact region). The liquid contact area RA can be in direct contact with the cooling water. The liquid contact area RA is, for example, an area along a longitudinal direction of the actuator 113 on the outer side opposite to a central side where the supply port 1111 is formed.

The supply port 1111 is an inlet for supplying the ink to the first common liquid chamber 1161. The supply port 1111 is a through-hole formed in the center of the substrate 111 in the lateral direction. The supply port 1111 extends along the longitudinal direction of the substrate 111. In other words, the supply port 1111 is, for example, an elongated hole (slot or oval) elongated along the longitudinal direction of the actuator 113 and the longitudinal direction of the first common liquid chamber 1161. The supply port 1111 is provided between the pair of actuators 113 and opens at the position facing the first common liquid chamber 1161.

A fourth electrode portion 1194 (which is a portion of a common electrode 119) is formed on an inner wall surface of the supply port 1111.

The discharge port 1112 is an outlet for discharging the ink from the first common liquid chamber 1161, the pressure chamber 1131, and the second common liquid chamber 1162. A plurality of (for example, four) discharge ports 1112 are provided. Each discharge port 1112 is, for example, between the first common liquid chamber 1161 and each of the second common liquid chamber 1162 and adjacent to both end portions of the pair of actuators 113 in the longitudinal direction. It is noted that the plurality of discharge ports 1112 may be provided in the second common liquid chamber 1162.

The actuator 113 and the frame 112 are provided on the substrate 111. The inside of the frame 112 of the substrate 111 serves as a liquid contact area (ink contact region) where the ink may be present, and the outside of the frame 112 is a mounting area to which various electronic components can be connected.

The frame 112 is fixed to the substrate 111 with adhesive or the like. The frame 112 surrounds the supply port 1111, the plurality of discharge ports 1112, and the actuator 113 provided in the substrate 111.

For example, the frame 112 is formed in a rectangular frame shape, so that the frame 112 forms an opening that is elongated in one direction along the longitudinal direction of the frame 112. The frame 112 may have a stepped structure where a portion of the front surface is recessed. The pair of actuators 113, the supply port 1111, and the four discharge ports 1112 are arranged within the opening of the frame 112. The frame 112 surrounds the actuator 113 between the nozzle plate 114 and the substrate 111 and is configured to be capable of retaining liquid within.

The pair of actuators 113 are adhered to the front surface 115 of the substrate 111. The pair of actuators 113 are aligned in two rows with the supply port 1111 interposed therebetween. The actuator 113 is formed in a plate shape elongated in one direction. The actuators 113 are arranged in the opening of the frame 112 and adhered to the front surface 115 of the substrate 111.

Each actuator 113 has a plurality of pressure chambers 1131 arranged at equal intervals in the longitudinal direction and air chambers 1132 arranged at equal intervals in the longitudinal direction between adjacent pressure chambers 1131. In other words, the actuator 113 has the plurality of pressure chambers 1131 and the air chambers 1132 that are alternately arranged along the longitudinal direction. The pressure chambers 1131 and air chambers 1132 extend in a direction intersecting an alignment direction, for example, in the lateral direction of the actuator 113.

A top surface of the actuator 113 opposite to the substrate 111 is adhered to the nozzle plate 114. The actuators 113 are arranged to be aligned at equal intervals in the longitudinal direction, and the plurality of grooves are formed along a direction perpendicular to the longitudinal direction. The plurality of grooves form the plurality of pressure chambers 1131 and the plurality of air chambers 1132. In other words, the actuator 113 has a plurality of piezoelectric bodies 1133 which are drive elements constituting sidewalls of the grooves between the piezoelectric bodies 1133. The piezoelectric bodies 1133 form the plurality of pressure chambers 1131 and the plurality of air chambers 1132, and thus, a volume of the pressure chambers 1131 can be changed by applying a drive voltage.

In an example, the width of the actuator 113 in the lateral direction gradually increases from a top side toward the substrate 111 side. A cross-sectional shape of the cross section along a direction (lateral direction) perpendicular to the longitudinal direction of the actuator 113 is formed in a trapezoidal shape. That is, the actuator 113 has an inclined surface 1134 that is inclined on the side portion in the lateral direction. The side portion (inclined surface 1134) is arranged to face the first common liquid chamber 1161 and the second common liquid chamber 1162. A second electrode portion 1182 (which is a portion of an individual electrode 118) and a second electrode portion 1192 (which is a portion of a common electrode 119) are formed on the inclined surface 1134.

As a specific example, the actuator 113 is formed of stacked piezoelectric members in which two rectangular plate-shaped piezoelectric materials are adhered to face each other so that the polarization directions are opposite to each other. The piezoelectric material can be, for example, PZT (lead zirconate titanate). The actuator 113 is adhered to the front surface 115 of the substrate 111 by, for example, thermosetting epoxy adhesive. The actuator 113 has an inclined surface 1134 formed by, for example, cutting. The substrate 111 and the actuator 113 are polished, for example, by polishing the front surface 115 on which the plurality of individual electrodes 118 and the common electrode 119 are patterned. In addition, the actuator 113 has a plurality of grooves forming the plurality of pressure chambers 1131 and the plurality of air chambers 1132. These grooves can be formed by cutting of the piezoelectric material which also forms the piezoelectric body (driving element) 1133 that is a side wall partitioning the adjacent grooves.

A first electrode portion 1181 and the second electrode portion 1182 (which are both a portion of an individual electrode 118) and a first electrode portion 1191 and the second electrode portion 1192 (which are both a portion of a common electrode 119) are formed in the actuator 113.

The pressure chambers 1131 are deformed when the liquid ejection head 1 performs an operation such as printing, so that the ink is ejected from nozzles 1141. Each pressure chamber 1131 has an inlet to the first common liquid chamber 1161 and an outlet to the second common liquid chamber 1162. The ink flows into the pressure chamber 1131 from the inlet, and out from the outlet. It is noted that the pressure chamber 1131 may have a configuration where the ink flows in from both the openings described as the inlet and the outlet. The first electrode portions 1181 are formed in the grooves constituting the pressure chambers 1131.

As illustrated in FIG. 9 and the like, the air chamber 1132 has the inlet side and the outlet side closed by a liquid-proof wall 1135 formed of a photosensitive resin or the like, so that the air chamber 1132 is separated from the first common liquid chamber 1161 and the second common liquid chamber 1162. The first electrode portion 1191 is formed in an air chamber 1132. As a specific example, the liquid-proof wall 1135 of the air chamber 1132 is formed by injecting an ultraviolet curing resin onto the first electrode portion 1191 in the groove forming the air chamber 1132, and after that, irradiating the area exposed by using an exposure mask or the like, for example, both end portions, that are the inlet side and the exit side, of the groove with ultraviolet rays. The liquid-proof wall 1135 prevents the ink from invading the air chamber 1132. In addition, the air chamber 1132 is closed by the nozzle plate 114, and thus, a nozzle 1141 is not arranged above the air chambers 1132. Therefore, the ink does not flow into or out of the air chamber 1132.

The nozzle plate 114 is formed in a plate shape. The nozzle plate 114 is fixed to the frame 112 opposite to the substrate 111 with adhesive or the like. The nozzle plate 114 has a plurality of nozzles 1141 formed at positions facing the plurality of pressure chambers 1131. In the present embodiment, the nozzle plate 114 has two nozzle rows 1142 in which the plurality of nozzles 1141 are arranged in one direction.

The first common liquid chamber 1161 is formed between the central sides of the pair of actuators 113 excluding both end portions, and constitutes an ink flow path from the supply port 1111 to the primary side openings (inlets) of the plurality of pressure chambers 1131 of each actuator 113. The first common liquid chamber 1161 extends along the longitudinal direction of the actuator 113. The first common liquid chamber 1161 constitutes a portion of an ink flow path which is a second flow path.

The second common liquid chamber 1162 is formed between each actuator 113 and the frame 112. The second common liquid chamber 1162 forms the ink flow path from the secondary side openings (outlets) of the plurality of pressure chambers 1131 to the discharge port 1112. The second common liquid chamber 1162 extends along the longitudinal direction of the actuator 113. The second common liquid chamber 1162 constitutes a portion of the ink flow path which is the second flow path.

The plurality of individual electrodes 118 individually apply drive voltages to the plurality of piezoelectric bodies 1133. The plurality of individual electrodes 118 can be used to selectively deform the respective pressure chambers 1131. The individual electrode 118 is formed by a wiring pattern formed on the substrate 111 and a wiring pattern formed on the actuator 113. The plurality of individual electrodes 118 extend from the plurality of pressure chambers 1131 along the lateral direction of the actuators 113 and are drawn out to a region of an outer side of the pair of actuators 113.

As a specific example, as illustrated in FIGS. 7 to 11, the plurality of individual electrodes 118 are deposited on the inner surface of each pressure chamber 1131, the inclined surface 1134 of the actuator 113, and the substrate 111. Specifically, the individual electrodes 118 are formed on an inner side surface of the piezoelectric body 1133 forming the pressure chamber 1131 and a bottom surface of the pressure chamber 1131. In addition, the individual electrodes 118 are formed, for example, on the inclined surface 1134 and a portion of the front surface 115 of the substrate 111. The individual electrodes 118 extend from the pressure chambers 1131 to the ends of the substrate 111 in the lateral direction, and the ends of the individual electrodes 118 are arranged at the connection portions 1116 to which the circuit board 14 of the substrate 111 is connected. That is, the individual electrode 118 includes the first electrode portion 1181 formed in the groove constituting a pressure chamber 1131 of the actuator 113, the second electrode portion 1182 formed on the inclined surface 1134 of the actuator 113, and the third electrode portion 1183 formed on the front surface 115 of the substrate 111. Each individual electrode 118 is provided in close contact with the bottom of the pressure chamber 1131 and the front surface of the piezoelectric member forming the piezoelectric body 1133. The individual electrode 118 is formed by stacking, for example, a nickel (Ni) sputtered film 191, an electroless Ni plated film 192, and an electrolytic gold (Au) plated film 193. The thickness of the individual electrode 118 is, for example, 0.5 μm to 5 μm.

Specifically, each of the first electrode portion 1181, the second electrode portion 1182, and the third electrode portion 1183 has a three-layer stacked structure of the Ni sputtered film 191, the electroless Ni plated film 192, and the electrolytic Au plated film 193. It is noted that the individual electrode 118 in some examples may exclude the electrolytic Au plated film 193. For example, the first electrode portion 1181 inside the groove forming the pressure chamber 1131 of the actuator 113 may have just a two-layer structure of the Ni sputtered film 191 and the electroless Ni plated film 192.

The common electrode 119 applies the same drive voltage to all of the plurality of piezoelectric bodies 1133. The common electrode 119 can be used to simultaneously deforms all of plurality of pressure chambers 1131. The common electrode 119 is formed by the wiring pattern formed on the substrate 111 and the wiring pattern formed on the actuator 113. The common electrode 119 is a wiring pattern provided from the inner peripheral surface of the supply port 1111 of the substrate 111 to the piezoelectric body 1133 forming the plurality of air chambers 1132. The common electrode 119 is connected to the circuit board 14. The common electrode 119 is drawn out from the air chamber 1132 to an area of a central portion between the pair of actuators 113. That is, the common electrode 119 is formed by integrally connecting the electrodes of the plurality of air chambers 1132 on the central side of the substrate.

As a specific example, the common electrode 119 is deposited on the inner surface of each air chamber 1132, the inclined surface 1134 of the actuator 113, the area avoiding the individual electrodes 118 on the front surface 115 of the substrate 111, the back surface of the substrate 111, and the inner surface of the supply port 1111. That is, the common electrode 119 is formed on a portion of the piezoelectric member constituting the side surface of the piezoelectric body 1133 forming each air chamber 1132 and the bottom of the air chamber 1132. As a specific example, the common electrode 119 is provided on the inclined surface 1134 from inside each air chamber 1132 toward the central portion of the substrate 111 and on the front surface 115 of the substrate 111 between the pair of actuators 113 and the inner peripheral surface of the supply port 1111. In addition, the common electrode 119 is also formed on the back surface 117 of the substrate 111. For example, the common electrode 119 extends to the end (edge) of the substrate 111 in the lateral direction, and the end is arranged at the connection portion 1116 to which the circuit board 14 of the substrate 111 is connected.

In other words, the common electrode 119 is provided on the central side of the substrate 111 in the lateral direction between the pair of actuators 113 from the connection portion 1116 formed at the end in the lateral direction of the substrate 111. Then, a portion of the common electrode 119 provided on the substrate 111 extends in the thickness direction of the substrate 111 on the inner peripheral surface of the supply port 1111. In addition, a portion of the common electrode 119 is provided on the front (upper) surface of the piezoelectric member forming each air chamber 1132. Furthermore, a portion of the common electrode 119 is provided on the back surface 117 of the substrate 111.

That is, the common electrode 119 has the first electrode portion 1191 formed in the groove constituting the air chamber 1132 of the actuator 113, the second electrode portion 1192 formed on the inclined surface 1134 of the actuator 113, the third electrode portion 1193 formed on the front surface 115 of the substrate 111, the fourth electrode portion 1194 formed on the inner peripheral surface of the supply port 1111, and the fifth electrode portion 1195 formed on the back surface 117 of the substrate 111. Each of the electrode portions 1191 to 1195 of the common electrode 119 avoids contact/overlap with the individual electrodes 118. Each of the electrode portions 1191 to 1195 of the common electrode 119 may be partially formed on the front surface of the substrate 111 or the actuator 113.

For example, the fifth electrode portion 1195 is formed on the back surface of the substrate 111 at a position outside the first cooling flow path 1213. That is, on the back surface of the substrate 111, the fifth electrode portion 1195 is formed to avoid the liquid contact area RA that faces the manifold grooves constituting the first cooling flow path 1213. The fifth electrode portion 1195 can be formed in an elongated central region RB extending along the longitudinal direction (length) of the actuator 113 (region including the supply port 1111), in an area between the pair of actuators 113 and in the end regions RC (regions including a discharge port 1112) from the supply port 1111. The fifth electrode portion 1195 extends from the region RB into at least one of the end regions RC. The fifth electrode portion 1195 is divided at the predetermined distance from the liquid contact areas RA at the supply port 1111 interposed therebetween.

For the common electrode 119, the third electrode portion 1193 (on the front surface 115 of the substrate 111) and the fifth electrode portion 1195 (on the back surface 117) are connected by the fourth electrode portion 1194, which is inside the supply port 1111. It is noted that the common electrode 119 may, in some examples, also extend to the ends (edges) of the front surface 115 of the substrate 111 and continue to the back surface through or at the end surfaces of the substrate 111.

The common electrode 119 is provided so as to be in close contact with the bottom of the air chamber 1132 and the front surface of the piezoelectric member forming the piezoelectric body 1133. The common electrode 119 has a multilayer structure in which, for example, a Ni sputtered film 191, an electroless Ni plated film 192, and an electrolytic Au plated film 193 are stacked. In the present example, the electrode film constituting the common electrode 119 has a three-layer stacked structure of a Ni sputtered film 191, an electroless Ni plated film 192, and an electrolytic Au plated film 193 on the front side of substrate 111 and a two-layer stacked structure of a Ni sputtered film 191 and an electrolytic Au plated film 193 on the back side of the substrate 111.

Specifically, in this example, the first electrode portion 1191, the second electrode portion 1192, and the third electrode portion 1193 each has a three-layer stacked structure of a Ni sputtered film 191, an electroless Ni plated film 192, and an electrolytic Au plated film 193. In some examples, the first electrode portion 1191 inside the groove may have a two-layer structure of a Ni sputtered film 191 and an electroless Ni plated film 192.

In some examples, the fourth electrode portion 1194 and the fifth electrode portion 1195 may have a two-layer stacked structure of a Ni sputtered film 191 and an electrolytic Au plated film 193.

The thickness of the common electrode 119 is, for example, 0.5 μm to 5 μm. It is noted that the thickness of the common electrode 119 is, in general, set to be larger than the thickness of the individual electrodes 118. In addition, the common electrode 119 is configured to have lower electrical resistance (e.g., per unit length) than the individual electrodes 118. In other words, the thickness of the individual electrodes 118 may be less than the thickness of the common electrode 119. In general, the individual electrode 118 has a higher resistance value per unit length or the like than the common electrode 119.

As illustrated in FIGS. 1, 3, and 4, the manifold unit 12 includes a manifold 121, a top plate 122, an ink supply tube 123, an ink discharge tube 124, a first cooling water supply tube 125, and a first cooling water discharge tube 126. It is noted that the number of the ink supply tubes 123, the ink discharge tubes 124, the first cooling water supply tubes 125, and the first cooling water discharge tubes 126 can be set as appropriate.

The manifold 121 is formed in a plate shape or a block shape. The manifold 121 includes a supply flow path 1211 that is continuous with the supply port 1111 of the substrate 111 and forms a liquid supply flow path (which is a portion of the second flow path), a discharge flow path that is continuous with the discharge port 1112 of the substrate 111 and forms the liquid discharge flow path that is a portion of the second flow path, and a first cooling flow path 1213 that forms the flow path of temperature control fluid. It is noted that, since the manifold 121 is connected to the pair of head bodies 11, the manifold 121 has a pair of supply flow paths 1211 and a pair of discharge paths.

The manifold 121 is formed, for example, by assembling a plurality of manifold members to form the supply flow path 1211, the discharge path, and the first cooling flow path 1213.

One main surface of the manifold 121 is fixed to the back surface 117 of the substrate 111. In addition, the top plate 122 is fixed to the manifold 121. The ink supply tube 123, the ink discharge tube 124, the first cooling water supply tube 125, and the first cooling water discharge tube 126 can be fixed to the manifold 121 through the top plate 122.

The supply flow path 1211 is formed in the manifold 121 by holes or grooves. For example, the supply flow path 1211 is a cuboidal liquid chamber extending along the longitudinal direction of the actuator 113 and the longitudinal direction of the supply port 1111. The supply flow path 1211 fluidly connects the ink supply tube 123 and the supply port 1111 of the substrate 111.

The discharge flow path is formed in the manifold 121 by holes or grooves. The discharge flow path fluidly connects the ink discharge tube 124 and the discharge port 1112 of the substrate 111.

The first cooling flow path 1213 is formed in the manifold 121 by holes or grooves. The first cooling flow path 1213 has a groove formed in the main surface of the manifold 121 facing the back surface of the substrate 111, and the opening of the groove is covered by the substrate 111, so that a predetermined flow path is formed. In this example, one first cooling flow path 1213 is formed for each actuator 113. In this example, the first cooling flow path 1213 is arranged on the side of the actuator 113 on the discharge side of the pressure chamber 1131 and extends along the longitudinal direction of the actuator 113. The first cooling flow path 1213 can be formed at the facing position on the substrate 111, on the outside the central region where the supply port 1111 is formed. The first cooling flow path 1213 fluidly connects the cooling water supply tube 125 and the cooling water discharge tube 126.

The ends of the first cooling flow path 1213 are openings connected to the cooling water supply tube 125 and the cooling water discharge tube 126 provided on one main surface of the manifold 121. In addition, the first cooling flow path 1213 is formed so as to be able to exchange heat with the substrate 111 fixed to the manifold 121.

The top plate 122 is provided on the surface of the manifold 121 opposite to the surface on which the substrate 111 is provided. In addition, the top plate 122 also has openings that connect the tubes 123, 124, and 125 and allow the tubes 123, 124, and 125 and the flow paths 1211 and 1213 to communicate with each other.

The ink supply tube 123 is connected to the supply flow path 1211. The ink discharge tube 124 is connected to the discharge flow path. The cooling water supply tube 125 and the cooling water discharge tube 126 are connected to the primary side and secondary side of the first cooling flow path 1213.

In the present embodiment, a pair of ink supply tubes 123 and a first cooling water discharge tube 126 are arranged on one end side of the manifold 121 in the longitudinal direction, and a pair of ink discharge tubes 124 and a first cooling water supply tube 125 are arranged on the other end side of the manifold 121 in the longitudinal direction.

The cooling flow path unit 13 has a plurality of second cooling flow paths 1312, a plurality of second cooling water supply tubes 133, and a plurality of second cooling water discharge tubes 134. A plurality of openings 1314 are formed between the plurality of second cooling flow paths 1312 in the cooling flow path unit 13. The cooling flow path unit 13 is connected to the cooling device 2116 of the liquid ejection apparatus 2. The second cooling flow paths 1312 are elongated in one direction (direction X) and arranged to be aligned in a direction (direction Y) perpendicular to the longitudinal direction of the second cooling flow paths 1312.

As a specific example, since the pair of head bodies 11 are provided in the present embodiment, four nozzle rows 1142, four actuators 113 (four rows), and four driver ICs 142 (four rows) are provided. For this reason, the cooling flow path unit 13 has three second cooling flow paths 1312, and two openings 1314 are formed between the second cooling flow paths 1312.

The plurality of second cooling flow paths 1312 are connected to the second cooling water supply tube 133 and the second cooling water discharge tube 134.

In the cooling flow path unit 13, a portion of the driver IC 142 described later of the circuit board 14 and a printed wiring board 143 are arranged in the plurality of openings 1314, and the plurality of second cooling flow paths 1312 are arranged to face the driver IC 142 which is the heating element, so that cooling of the driver IC 142 is performed.

As illustrated in FIGS. 3 and 4, circuit board 14 includes a driver IC 142 of which one end is connected to the connection portion 1116 of the substrate 111 and the printed wiring board 143.

The circuit board 14 drives an actuator 113 by applying the drive voltage to the wiring pattern of the actuator 113 from the driver IC 142, expands or contracts the volume of the pressure chamber 1131, and ejects liquid droplets from the nozzle 1141 thereby.

The driver IC 142 is connected to a plurality of individual electrodes 118 and a common electrode 119 through the ACF (anisotropic conductive film) fixed to the connection portion of the substrate 111 by thermocompression. The driver IC 142 generates heat during operation. It is noted that the driver IC 142 may be connected to a plurality of individual electrodes 118 and a common electrode 119 by other means such as ACP (anisotropic conductive paste), NCF (non-conductive film), and NCP (non-conductive paste). A plurality of driver ICs 142 are provided, for example, for each head body 11. In the present embodiment, two driver ICs 142 are connected to each actuator 113. The driver IC 142 is, for example, a COF (chip on film) in which the driver IC chip is mounted on a film. The front surface of the driver IC 142 is in contact with the outer surface of the second cooling flow path 1312.

The printed wiring board 143 can be a PWA (printing wiring assembly) on which various electronic components and connectors are mounted.

The cover 15 includes, for example, an outer shell 151 covering the side surfaces of the pair of head bodies 11, the manifold unit 12, and the circuit board 14 and a mask plate covering a portion of the pair of head bodies 11 on the nozzle plate 114 side.

The outer shell 151 exposes, for example, the ink supply tube 123, the ink discharge tube 124, the cooling water supply tube 125, the cooling water discharge tube of the manifold unit 12, and the end of the circuit board 14 to the outside.

The mask plate covers the pair of head bodies 11 excepting for the nozzles 1141 and the nozzle plate 114 area surrounding the nozzles 1141.

The liquid ejection head 1 has a plurality of individual electrodes 118 each capable of individually applying a drive voltage to one of the piezoelectric bodies 1133 and a common electrode 119 for simultaneously (or substantially so) applying a drive voltage to all the piezoelectric bodies 1133 in the head body 11.

By this design, the liquid ejection head 1 can drive the plurality of pressure chambers 1131 selectively in groups, individually, or in common (all at once). When a pressure chamber 1131 is driven, the pressure chamber 1131 is deformed in a shear-mode, and thus, the ink in the pressure chamber 1131 is pressurized (compressed). Therefore, the liquid ejection head 1 can selectively eject the ink from any of the nozzles 1141 facing the pressure chambers 1131.

The common electrode 119 is also formed on the front surface 115 of the actuator 113, the inclined surface 1134 of the actuator 113, the inner surface of the air chamber 1132, and the inner peripheral surface of the supply port 1111 formed in the substrate 111.

The liquid ejection head 1 has the first cooling flow path 1213 for cooling the head body 11 and the second cooling flow path 1312 for cooling the driver IC 142 using cooling water (or other fluid) supplied via the manifold unit 12 and the cooling flow path unit 13. The cooling water supplied from the second cooling water supply tube 133 is discharged from the second cooling water discharge tube 134 after passing through the first cooling flow path 1213 or the second cooling flow path 1312. The cooling water flowing through the first cooling flow path 1213 cools the head body 11, and the cooling water flowing through the second cooling flow path 1312 cools the driver IC 142.

Figure 12:
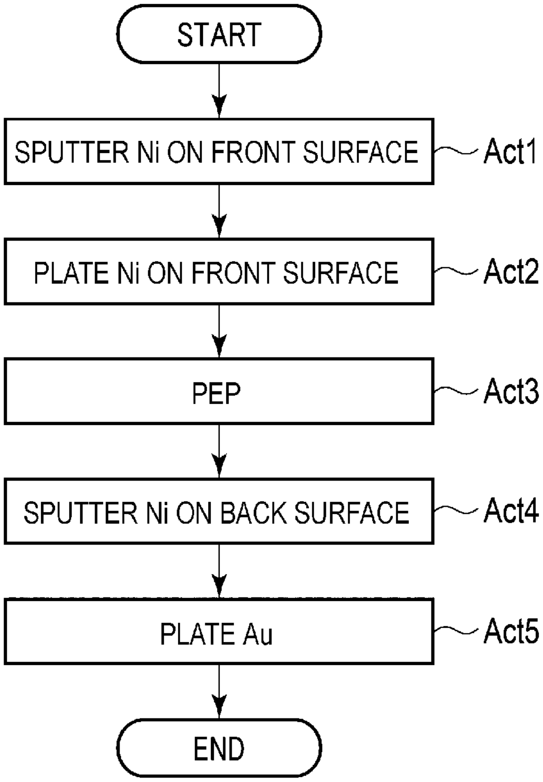
FIG. 12 depicts aspects of a method of manufacturing a liquid ejection head.

Next, a method of manufacturing a liquid ejection head 1 will be described. In particular, an electrode forming process will be described with reference to FIG. 12. FIG. 12 is a flowchart illustrating aspects of the electrode forming process that can be used in the method of manufacturing the liquid ejection head 1.

First, in Act1, on the front surface side of the substrate 111, sputtering is performed on predetermined regions of the substrate 111 and the actuator 113 to form an Ni sputtered film 191 (front surface Ni sputtering). Specifically, the Ni sputtered film 191 is formed on the inclined surface 1134 of the actuator 113, the inner surfaces of the grooves constituting the plurality of pressure chambers 1131 and the plurality of air chambers 1132 of the actuator 113, and the inner wall of the supply port 1111, on the front surface 115 of the substrate 111 including the polished surface.

In Act2, an electroless Ni plated film 192 is formed on the Ni sputtered film 191 on the front surface side of the substrate 111 by electroless plating (front surface Ni plating). For example, the electroless Ni plated film 192 is formed by using the Ni sputtered film 191 as a catalyst. In Act2, the electroless Ni plated film 192 is formed on the Ni sputtered film 191 on the inclined surface 1134 of the actuator 113, on the inner surfaces of the grooves constituting the plurality of pressure chambers 1131 and the plurality of air chambers 1132 of the actuator 113, and on the inner wall of the supply port 1111, on the front surface 115 of the substrate 111 including the polished surface.

Next, in Act3, the Ni sputtered film 191 and the electroless Ni plated film 192 formed in Act1 and Act2 are patterned by, for example, PEP (photo engraving process).

In Act4, sputtering is performed on the back surface side of the substrate 111 while masking a non-formation region including the liquid contact area RA to form the Ni sputtered film 191 (back surface Ni sputtering). As described above, the Ni sputtered film 191 is formed in a predetermined formation target portion including the central region RB and the end region RC, which are regions different from the liquid contact area RA.

Next, in Act5, an electroplating method is used to form an electrolytic Au plated film 193 on the electrode films of the front and back surfaces that were patterned in Act3 and Act4. By adopting such a method, the electrodes can be formed so as to avoid the cooling water region on the back surface side of the substrate. It is noted that the electrolytic Au plated film 193 may be formed inside the pressure chamber 1131 and the air chamber 1132 or may not be formed.

A liquid ejection apparatus 2 having the liquid ejection head 1 will be described with reference to FIG. 13. The liquid ejection apparatus 2 includes a housing 2111, a medium supply unit 2112, an image formation unit 2113, a medium discharge unit 2114, a conveying device 2115 as a support device, a maintenance device 2117, and a control unit 2118. The liquid ejection apparatus 2 also includes a cooling device that controls the temperature of the ink supplied to the liquid ejection head 1.

The liquid ejection apparatus 2 is an inkjet printer that performs an image forming process on paper P by ejecting ink while conveying the paper P through the image formation unit 2113 along a conveyance path 2001 from the medium supply unit 2112 to the medium discharge unit 2114.

The medium supply unit 2112 has a plurality of paper feed cassettes 21121. The image formation unit 2113 includes a support unit 2120 that supports the paper and a plurality of head units 2130 arranged to face each other above the support unit 2120. The medium discharge unit 2114 includes a paper discharge tray 21141.

The support unit 2120 includes a conveying belt 21201 provided in a loop shape in a predetermined area for performing image formation, a support plate 21202 supporting the conveying belt 21201 from the back side, and a plurality of belt rollers 21203 provided on the back side of the conveying belt 21201.

The head unit 2130 includes a plurality of the liquid ejection heads 1 which are inkjet heads, a plurality of supply tanks 2132 mounted on the respective liquid ejection heads 1, a pump 2134 that supplies the ink, and a connection flow path 2135 that connects the liquid ejection heads 1 and the supply tank 2132.

In the present embodiment, a liquid ejection head 1 is provided four colors of cyan, magenta, yellow, and black and four supply tanks 2132 of the respective colors. Each supply tank 2132 is connected to a corresponding liquid ejection head 1 by a connection flow path 2135.

The pump 2134 is, for example, a liquid feed pump such as piezoelectric pump. The pump 2134 is connected to the control unit 2118 and driven and controlled by the control unit 2118.

The connection flow path 2135 has the supply flow path connected to the ink supply tube 123 of the liquid ejection head 1. In addition, the connection flow path 2135 includes a recovery flow path connected to the ink discharge tube 124 of the liquid ejection head 1. For example, if the liquid ejection head 1 is of the non-circulating type, a recovery flow path is connected to the maintenance device 2117 (ink collection device), and if the liquid ejection head 1 is of the circulating type, the recovery flow path is connected to the supply tank 2132.

The conveying device 2115 conveys the paper P along the conveyance path 2001 from the paper feed cassette 21121 of the medium supply unit 2112 to the paper discharge tray 21141 of the medium discharge unit 2114 through the image formation unit 2113. The conveying device 2115 includes a plurality of guide plate pairs 21211 to 21218 arranged along the conveyance path 2001 and a plurality of conveying rollers 21221 to 21228. The conveying device 2115 supports the paper P so as to be movable relative to the liquid ejection head 1.

The cooling device 2116 has a cooling water tank 21161, a cooling circuit 21162 such as pipes and tubes for supplying the cooling water, a pump for supplying the cooling water, a cooler for controlling the temperature of the cooling water, and the like. The cooling device 2116 supplies the cooling water in the cooling water tank 21161 adjusted to the predetermined temperature by the cooler to the second cooling water supply tube 133 through the cooling circuit 21162 by water supplying of the pump. In addition, the cooling device 2116 recovers the water discharged from the second cooling water discharge tube 134 through the first cooling flow path 1213 and the second cooling flow path 1312 to the cooling water tank 21161 through the cooling circuit 21162. It is noted that the cooler is, for example, a heat exchanger.

The maintenance device 2117, for example, suctions and collects the ink remaining on the outer surface of the nozzle plate 114 during a maintenance operation. In addition, if the liquid ejection head 1 is of the non-circulating type, the maintenance device 2117 removes the ink inside the head body 11 during a maintenance operation. The maintenance device 2117 has a tray, a tank, or the like for storing the recovered ink.

The control unit 2118 includes a CPU 21181 as an example of a processor, a memory such as a ROM (read only memory) for storing various programs, and a RAM (random access memory) for temporarily storing various variable data and image data, and an interface unit for inputting data from the outside and outputting data to the outside.

In the liquid ejection head 1 and the liquid ejection apparatus 2 configured in this manner, the fifth electrode portion 1195 is formed on the back surface of the substrate 111 at a position different from the first cooling flow path 1213 through which the cooling water or the like flows, so that the required area of the common electrode 119 can be provided while maintaining the cooling performance without requiring contact between the common electrode 119 the cooling water (or the like). Therefore, the common electrode 119 can thus be prevented from being corroded by electrolysis while supplying electricity during operations, and the resistance of the common electrode 119 can be kept low over time. By avoiding an increase in common electrode 119 resistance, the driver IC can be prevented from being damaged due to latch-up or the like. In addition, when the liquid is ejected, occurrence of a difference in a drive waveform between the end chambers and the middle chambers within a row can be avoided, and good printing quality such as consistent dot diameter and linearity can be maintained. In an embodiment, the film thickness of the electrode portion inside the pressure chamber 1131 can be reduced to promote adhesion of the electrode film. On the other hand, for the film thickness of the electrode portion inside the air chamber 1132 can be large and even if the adhesion of the electrode film inside the air chamber 1132 is relatively low, the peeling of the electrode can be avoided due to the formation of the liquid-proof wall 1135.

It is noted that the embodiments of the present disclosure are not limited to the configurations described above. Below, some additional examples of embodiments are described. In the following description, the same configurations, components, or aspects as present in the first embodiment are denoted by the same reference numerals, and detailed description thereof will be omitted.

In an example, the supply port 1111 is an elongated hole arranged between a pair of actuators 113 and a discharge port 1112 is arranged at both ends of the pair of actuators 113 in the longitudinal direction, but the present disclosure is not limited thereto, the shape, number, and arrangement (positioning) of the supply port 1111 and the discharge port 1112 can be varied as appropriate.

In some examples, the electrode film constituting the common electrode 119 may be formed on the inner wall of the discharge port 1112 in addition to the supply port 1111. Alternatively, the electrode film constituting the common electrode 119 may be formed on an outer end surface of the substrate 111. The substrate 111 may be formed with a through-hole having the electrode film constituting a portion of the common electrode 119 formed on the inner surface thereof. For example, the common electrode 119 can be provided by an electrode film formed on the discharge port 1112, the end surface, and/or a through-hole, and the resistance value of the common electrode 119 can be further reduced.

In an example, the individual electrode 118 is formed in the pressure chamber 1131 and the common electrode 119 is formed in the air chamber 1132, but the present disclosure is not limited thereto. For example, the common electrode 119 may be formed in the pressure chamber 1131, and the individual electrode 118 may be formed in the air chamber 1132.

In an example, liquid ejection head 1 is provided with a pair of head bodies 11, but the present disclosure is not limited thereto, and a configuration having a single head body 11 may be adopted. In addition, although a configuration was described in which the head body 11 is provided with a pair of actuators 113, the present disclosure is not limited thereto. For example, a configuration where the head body 11 has a single actuator 113 may be adopted.

The liquid ejection head 1 can be of the non-circulating type or the circulating type.

In an example, one side of each pressure chamber 1131 is the supply side, the other side is the discharge side. In such an arrangement, ink flows in from one side of the pressure chamber 1131 and flows out from the other side is exemplified, but the present disclosure is not limited thereto. For example, a configuration in which common chambers on both sides of the pressure chamber 1131 are a supply side and the ink flows into the pressure chamber from both sides (ends) may be adopted. In addition, the supply side and the discharge side may be configured to be reversed from the described example or may be configured to be switchable as needed.

In an example, a side shooter type inkjet head is described, but the present disclosure is not limited to this, and an end-shooter type inkjet head may be adopted.

The liquid to be ejected is not limited to ink for printing (printer ink), and a device for ejecting a liquid containing conductive particles for forming a wiring pattern of a printed wiring board may be used.

In an example, an inkjet head is used in the liquid ejection apparatus such as an inkjet printer, but the present disclosure is not limited thereto. A liquid ejection head of an embodiment can be used in 3D printers, industrial manufacturing machines, and medical applications and can reduce the size, weight, and cost of such devices.

According to at least one embodiment described above, since the common electrode 119 is formed on the end surface of the substrate, printing quality can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a substrate with an opening through which a first liquid can pass;

an actuator on a first side of the substrate and having a plurality of pressure chambers for ejecting the first liquid, each pressure chamber being associated with an addressable piezoelectric element for deforming the pressure chamber;

a manifold on a second side of the substrate opposite the first side, the manifold forming a first flow path for a second fluid; and a first electrode with portions formed on an upper surface of the actuator, a surface on the first side of the substrate, an inner wall of the opening, and a surface on the second side of the substrate in a region outside the first flow path, the first electrode being electrically connected in common to the addressable piezoelectric elements associated with each pressure chamber in the plurality of pressure chambers of the actuator.

2. The liquid ejection head according to claim 1, wherein the actuator has a plurality of air chambers between otherwise adjacent pairs of pressure chambers in the plurality of pressure chambers, the air chambers and pressure chambers alternating with each other along a first direction.

3. The liquid ejection head according to claim 2, further comprising:

a nozzle plate on the actuator and having nozzles communicating with the plurality of pressure chambers.

4. The liquid ejection head according to claim 3, wherein the first flow path is formed in a first region between the manifold and the second surface of the substrate, and a second flow path for the first liquid is formed in a second region between the manifold and the second surface.

5. The liquid ejection head according to claim 4, wherein the first electrode comprises at least a portion including a sputtered nickel film, an electroless plated nickel film, and an electrolytic plated gold film.

6. The liquid ejection head according to claim 5, further comprising:

a second electrode with portions on the upper surface of the actuator and the surface of the first side of the substrate, wherein the second electrode has at least one portion with a film thickness less than a maximum film thickness of the first electrode.

7. The liquid ejection head according to claim 6, wherein the opening is between a pair of actuators on the substrate in a second direction perpendicular to the first direction, the first electrode is drawn out from a pressure chamber or an air chamber of one of the pair of actuators to a central region between the pair of actuators in second direction, and the second electrode is drawn out from the air chambers or the pressure chamber of the one of the pair of actuators to an outer region outside the central region, the one of the pair of actuators being between the outer region and the central region in the second direction.

8. A liquid ejection head, comprising:

a substrate with a slot-shaped opening extending lengthwise in a first direction;

a first actuator on a first surface of the substrate to a first side of the slot-shaped opening in a second direction perpendicular to the first direction;

a second actuator on the first surface of the substrate to a second side of the slot-shaped opening in the second direction a manifold on a second surface of the substrate opposite the first surface, the manifold including grooves forming a first flow path for a cooling fluid and a second flow path for an ink, the second flow path being connected to the slot-shaped opening;

a common electrode connected to the first and second actuators with portions formed on an upper surface of the first and second actuators, the first surface of the substrate, a sidewall of the slot-shaped opening, and the second surface of the substrate; and a plurality of individual electrodes connected to the first and second actuators, each individual electrode including portions formed on the upper surface of the first or second actuators and the first surface of the substrate.

9. The liquid ejection head according to claim 8, wherein the common electrode comprises at least a portion including a sputtered nickel film, an electroless plated nickel film, and an electrolytic plated gold film.

10. The liquid ejection head according to claim 8, wherein each individual electrode in the plurality of individual electrodes has at least one portion with a film thickness less than a maximum film thickness of the common electrode.

11. The liquid ejection head according to claim 8, wherein the substrate includes a through-hole at a position in an end region of the substrate beyond the first and second actuators in the first direction, and the common electrode further includes a portion on a sidewall of the through-hole.

12. The liquid ejection head according to claim 11, wherein the through-hole is a discharge port for the ink.

13. The liquid ejection head according to claim 8, wherein each individual electrode in the plurality of individual electrodes extends in the second direction to an outer edge of the substrate.

14. The liquid ejection head according to claim 8, wherein the upper surfaces of each of the first and second actuators include an inclined portion.

15. A liquid ejection apparatus, comprising:

a liquid ejection head configured to eject a liquid from at least one nozzle, the liquid ejection head including:

a substrate with an opening through which the liquid can pass;

an actuator on a first side of the substrate and having a plurality of pressure chambers for ejecting the liquid, each pressure chamber being associated with an addressable piezoelectric element for deforming the pressure chamber;

a manifold on a second side of the substrate opposite the first side, the manifold forming a first flow path for a cooling fluid; and a first electrode with portions formed on an upper surface of the actuator, a surface on the first side of the substrate, an inner wall of the opening, and a surface on the second side of the substrate in a region outside the first flow path, the first electrode being electrically connected in common to the addressable piezoelectric elements associated with each pressure chamber in the plurality of pressure chambers of the actuator.

16. The liquid ejection apparatus according to claim 15, wherein the actuator has a plurality of air chambers between otherwise adjacent pairs of pressure chambers in the plurality of pressure chambers, the air chambers and pressure chambers alternating with each other along a first direction.

17. The liquid ejection apparatus according to claim 16, further comprising:

a nozzle plate on the actuator, the nozzle plate including the at least one nozzle, the at least one nozzle communicating with one of the plurality of pressure chambers.

18. The liquid ejection apparatus according to claim 17, wherein the first flow path is formed in a first region between the manifold and the second surface of the substrate, and a second flow path for the liquid is formed in a second region between the manifold and the second surface.

19. The liquid ejection apparatus according to claim 15, wherein the first electrode comprises at least a portion including a sputtered nickel film, an electroless plated nickel film, and an electrolytic plated gold film.

20. The liquid ejection apparatus according to claim 15, further comprising:

a second electrode with portions on the upper surface of the actuator and the surface of the first side of the substrate, wherein the second electrode has at least one portion with a film thickness less than a maximum film thickness of the first electrode.

* * * * *